United States Patent [19]

Hey et al.

[11] 3,989,864

[45] Nov. 2, 1976

[54] PROCESS FOR APPLYING ABRASION RESISTANT PHOSPHATE COATING TO GLASS CONTAINER

[75] Inventors: David Gordon Hey; Kevin Thomas McAloon, both of Runcorn, England

[73] Assignee: Imperial Chemical Industries Limited, London, England

[22] Filed: Apr. 7, 1975

[21] Appl. No.: 565,703

[30] Foreign Application Priority Data

Apr. 18, 1974 United Kingdom............... 17027/74

[52] U.S. Cl. ............................ 427/407 A; 65/60 B; 427/314; 427/419 G; 427/419 R; 427/424; 428/35

[51] Int. Cl.² ................... C03C 17/22; C03C 17/32

[58] Field of Search............ 427/418, 407 A, 419 G, 427/419 R, 424, 314; 428/35, 426; 65/60 A, 60 B

[56] References Cited

UNITED STATES PATENTS

| 3,420,693 | 1/1969 | Scholes et al....................... 65/60 A |
| 3,736,176 | 5/1973 | Francel et al................... 427/376 X |
| 3,819,346 | 6/1974 | Southwick et al. ................. 65/60 A |
| 3,876,410 | 4/1975 | Scholes............................... 65/60 A |

Primary Examiner—Ralph Husack
Attorney, Agent, or Firm—Cushman, Darby & Cushman

[57] ABSTRACT

A process for providing an abrasion resistant coating on the surface of a glass container by treating the container with a solution containing 0.5 to 10% by weight of phosphoric acid and less than 5% by weight of metal phosphate in an aqueous diluent, the temperature of the surface of the container being at least 300° C, and thereafter applying a lubricious organic cold-end coating to the surface of the container.

7 Claims, No Drawings

PROCESS FOR APPLYING ABRASION RESISTANT PHOSPHATE COATING TO GLASS CONTAINER

This invention relates to a coating process and in particular to a process for coating the surface of a glass container in order to improve the abrasion resistance of the container.

It is known that abrasion of the surface of a glass container, e.g. a bottle, results in a loss of strength in the container, caused, it is believed, by the flaws in the surface which result from the abrasion. Loss in strength of the container leads to a reduction in the burst strength of the container. This reduction in burst strength may have serious consequences where the container is relatively thin-walled and/or comprises contents under pressure, for example, where it contains a carbonated drink.

It is known to treat the surface of a glass container to provide on the surface of the container an abrasion resistant coating. This treatment has the effect of reducing the amount of strength loss in the container when the container is subjected to a given amount of abrasion when compared with the loss of strength which occurs when an untreated container is subjected to the same amount of abrasion. For example, it has been proposed in U.S. Pat. No. 3,736,176 to provide an abrasion resistant coating on a glass surface by treating the surface of an elevated temperature with an aqueous composition consisting of 2 to 23% by weight of phosphoric acid, 5 to 41% by weight of aluminium phosphate, and at least one percent of one or more other constituents selected from sodium phosphate, ammonium phosphate, aniline phosphate, magnesium oxide, carbonate, or nitrate, zinc oxide, carbonate or nitrate, aluminium halide and iron halide. It is stated in the aforementioned patent that the "other constituents" are essential if a satisfactory scratch resistance it to be obtained. Furthermore, it is also stated that a "phosphate coating of itself is highly opaque and low in chemical durability, low in optical resolution and low in abrasion resistance," and in particular that "while solutions containing only water, aluminium phosphate and phosphoric acid will form a coating on glass surfaces these coatings are quite opaque and have low scratch resistance and poor chemical durability."

It will be appreciated that any treatment of a glass container which results in the formation of an opaque surface on the container will be unsatisfactory. Indeed, it will be quite unacceptable.

We have now found, however, that contrary to the suggestion of the aforementioned U.S. Pat. it is possible to treat the surface of a glass container with an aqueous phosphoric acid solution to provide an abrasion resistant surface on the glass container which is not opaque and which suffers little or no reduction in clarity, provided the process conditions are carefully chosen.

Our process also provides advantages over other treatment processes commonly used in the glass container industry, for example, the so-called hot-end treatments which involve treating the surface of a glass container at an elevated temperature with a tin or titanium compound e.g. with a tin or titanium halide. Such treatments involve the use of corrosive materials and create a problem in the disposal of effluent from the process. The process of the present invention involves the use of less corrosive materials and the effluent problem is much less severe.

The present invention provides a process for treating the surface of a glass container the process comprising applying to the surface of the container a solution of phosphoric acid in an aqueous diluent, the solution containing from 0.5% to 10% by weight of phosphoric acid and the temperature of the surface of the container being at least 300° C, and thereafter applying to the surface of the container a cold-end coating (as hereinafter defined).

In the progress of the invention the solution may be applied to any form of glass container, for example, a bottle, a glass, a jug or a tank and it may be applied to substantially the whole of the surface of the container or to only a part thereof. In general, the exterior surface only of the glass container is treated and it is desirable, although not essential, that substantially the whole of the exterior surface of the container should be treated.

The container is suitably a glass bottle and the process of the invention is particularly suited to the treatment of so-called non-returnable, or "one-trip," glass bottles which are generally thin-walled and which thus in general need an abrasion resistant surface in order to prevent an undesirable decrease in the strength of the bottle on abrasion.

On account of the desirable results achieved by the process of the invention the phosphoric acid suitably comprises orthophosphoric acid and preferably consists essentially of orthophosphoric acid.

In the aqueous phosphoric acid solution the liquid diluent in general consists essentially of water although it may contain other liquid diluents, especially in minor amounts, for example, organic diluents e.g. lower alcohols. However, there is no particular advantage to be gained by using a solution containing an organic diluent, and indeed the use of such diluents may be disadvantageous in that a problem of disposal of effluent may be created.

The concentration of phosphoric acid in the solution should be in the range 0.5 to 10% by weight. Below 0.5% by weight application of the solution of phosphoric acid provides at most only a small improvement in the abrasion resistance of the container. Application of a solution having a concentration of phosphoric acid above 10% by weight provides little or no advantage. Indeed, the use of highly concentrated solutions of phosphoric acid is to be avoided as the effect may be that the surface of the glass container may become mottled or it may even become visibly etched. In any event, the treated container may become at least somewhat opaque and unsatisfactory for commercial use. The concentration of phosphoric acid in the solution used in the process of the invention is generally at least 1% by weight and is suitably not greater than 5% by weight. A preferred concentration is in the range 1½% to 4% by weight.

Although the solution used in the process of the present invention preferably consists essentially of an aqueous liquid diluent and phosphoric acid it may, if desired, contain other additives, although in general little or no advantage is thereby obtained. Although we do not exclude the possibility that the solution may contain a metal phosphate, in general such a metal phosphate, if present, should be present in a concentration of less than 5% by weight and preferably in a concentration not exceeding 2% by weight.

The aqueous solution of phosphoric acid is preferably applied to the surface of glass container by means of spraying. Other methods of application, for example, dipping of the container in the phosphoric acid solution may be used but spraying is the most convenient.

Spraying may be effected from a single spray head or from a plurality of spray heads. It is preferred to use a plurality of spray heads and to arrange the spray heads in such a way that a substantially even coating of the surface of the container is achieved. In order to achieve a substantial increase in abrasion resistance it is preferred to use a fine spray with the spray particles having a size in the range 5 to 100µm, more preferably 20 to 40µm.

The temperature at which the process is operated, that is the temperature of the surface of the glass container, should be at least 300° C, and is preferably in the range 300° C to 700° C. The particular temperature used should be chosen to give the desired increase, and suitably the greatest increase, in the abrasion resistance while at the same time maintaining the desired clarity in the glass container. In general, the temperature of the surface of the glass container which is treated will be at a temperature of at least 350° C and will preferably be at a temperature in the range 450° C to 650° C.

The process of the present invention may be incorporated into a conventional glass container production process. Thus, the production process may comprise a glass container production stage, a treatment stage at which the abrasion resistant coating is applied to the containers, an annealing stage in which the containers are passed through an annealing lehr, and finally a stage at which a cold-end coating is applied to the containers.

The aqueous phosphoric acid solution may suitably be applied to the surface of the glass container shortly after the glass container has been formed and when the surface of the article is at the desired temperature. For example, the glass container may be passed on a suitable conveyor, e.g. a belt, from the production stage to and through a spray area at which the phosphoric acid solution is applied.

The amount of aqueous solution of phosphoric acid which is applied per glass container in order to improve the abrasion resistance of the surface of the container will depend on a number of factors; on the size of the container; in the case where the process is effected by spraying solution from a spray head, the speed at which the container passes the spray head; and on the amount of the solution which is actually applied to the surface of the container, it being appreciated that where a spray technique is used there is inevitably an appreciable loss of solution in that not all the solution sprayed actually contacts the surface of the container. In order to get a desired improvement in abrasion resistance of a glass container suitable adjustment of the aforementioned factors of speed of travel of the container and amount of solution sprayed, in addition to the previously mentioned parameters of temperature of the surface of the glass container and concentration of the phosphoric acid within the range 0.5 to 10% by weight should be made. This adjustment may be made by means of suitable experiment. We find however that where a spray technique is used then in general if an amount of solution is sprayed which contains from 10 to 30 g of phosphoric acid per 1000 containers a desirable increase in the abrasion resistance of the containers is obtained.

By cold-end coating we mean a coating of an organic material which is applied to the surface of a glass container at a temperature lower than the temperature at which an abrasion resistant coating is applied to a glass container and which is designed to supply lubricity to the container.

In the present case, of course, the abrasion resistant coating is provided by the aqueous solution of phosphoric acid.

Cold-end coatings are well known in the glass container art and are designed to lubricate glass containers so that the tendency of glass containers to stick together when they are contacted during processing or during use is reduced.

Cold-end coatings may be provided by applying a mixture of a suitable organic material and a liquid diluent to the glass container. The organic material may be in the form of a solution or a dispersion or an emulsion in the liquid diluent, and the liquid diluent is preferably an aqueous diluent. The concentration of the organic material may, for example, be in the range 0.01 to 10% by weight, preferably 0.1 to 2% by weight. The coating is generally applied at a temperature below 200° C e.g. at a temperature in the range 100° C to 150° C, although it can be applied at ambient temperature, desired.

The cold-end coating may suitably be applied to the glass containers after the glass containers have passed from the annealing lehr, although it is possible to apply the cold-end coating to the glass containers when the containers are in the annealing lehr, especially when they are in the cooler part of the lehr.

Suitable organic materials include various waxes, alkali metal salts of oleic acid, polyolefins, e.g. polyethylene and polypropylene and especially low molecular weight polyolyfins, polyethylene glycol, and metal stearates, e.g alkali metal and alkaline earth metal stearates, e.g. sodium and calcium stearates.

Glass containers treated by the process of the invention have a higher burst pressure after being subjected to a standard amount of abrasion than do containers which have been similarly cold-end treated but which have not been treated with an aqueous phosphoric acid solution. This indicates that when the treatment with aqueous phosphoric acid solution is omitted the loss in strength which occurs on abrasion of the containers is greater and thus that the abrasion resistance of the containers is less.

The invention is illustrated by the following Examples. The spraying unit which was used in these examples comprised a box 3½ft long by 1 ft wide and 2 ft high having an entry port in one of the 1 ft by 2 ft sides and an exit port in the other 1 ft by 2 ft side, and a belt passing through the box via the entry and exit ports. In the box were two Delavan - Watson type GA1 spray nozzles made of titanium which were, by means of air atomisation, capable of delivering the aqueous phosphoric acid solution in the form of a fine spray. The nozzles were positioned near the top of the box and pointing downwards towards the belt. The spray nozzle near the entry port was positioned pointing downwards and towards the direction of travel of the belt and that near the exit port was positioned pointing downwards and in a direction opposite to the direction of travel of the belt. The angles at which the spray nozzles were positioned pointing downwards were adjustable and were set so as to produce in the box as uniform a spray of aqueous phosphoric acid solution as possible. The angles were dependent to some extent on the size of the container passing through the spray box.

In the use bottles from an 8-station press and blow IS bottle-forming machine were passed on the belt through the spray box and there sprayed with an aqueous solution of phosphoric acid. The bottles were then passed on the belt to an annealing lehr and finally to a part of the process at which a stearate cold-end coating containing calcium stearate was applied to the bottles from a dilute aqueous solution.

In order to test their abrasion resistance bottles treated in the above process were subjected to a standard abrasion test and the burst pressure of the bottles was subsequently measured. Bottles which had been produced on the same machine and annealed and give a stearate cold-end coating but which had not been treated with aqueous phosphoric acid solution were similarly abraded and the burst pressures of the bottles subsequently measured. The increase in burst pressure of the bottles which had been treated with aqueous phosphoric acid solution over those which had not been so treated was taken as a measure of the abrasion resistance of the bottles produced by the treatment with aqueous phosphoric acid.

In the abrasion test 24 bottles were abraded on an American Glass Research Line Simulator under dry conditions for 10 minutes and the burst pressures were measured in an American Glass Research Incremental Pressure Tester and the pressure at which each bottle burst was recorded. The mean burst pressure for each set of 24 bottles was recorded.

EXAMPLE 1

A solution of 1.7% by weight of phosphoric acid in water was sprayed from the two nozzles of the spray box at a rate of 30 ml per minute from each nozzle onto ½ liter white non-returnable bottles passing through the spray box at a rate of 80 per minute. The temperature of the bottles was approximately 650° C. The treated bottles were clear and transparent.

The average burst pressure of the bottles treated by the process described was 265 lb/sq inch after abrasion whereas the average burst pressure of similar bottles which had been given a stearate cold-end coat and abraded but which had not been treated with aqueous phosphoric acid solution was only 212 lb sq inch, indicating that after a standard abrasion test the bottles treated by the process of the invention were 25% stronger than similarly abraded bottles which has not been treated by the process of the invention.

EXAMPLE 2

A solution of 2.3% by weight of phosphoric acid in water was sprayed from the two nozzles of the spray box at a rate of 49 ml per minute from each nozzle onto ¼ liter white non-returnable bottles passing through the spray box at a rate of 110 per minute. The temperature of the bottles was approximately 650° C. The treated bottles were clear and transparent.

The average burst pressure of the bottles treated by the process of the invention was 269 lb/sq inch after abrasion whereas the average burst pressure of similar bottles which had been given a stearate cold-end coat and abraded but which had not been treated with aqueous phosphoric acid solution was only 202 lb/sq inch indicating that after abrasion the burst pressure of the former bottles was 33% greater.

EXAMPLE 3

The process of Example 2 was repeated except that the concentration of phosphoric acid in the aqueous solution was 3.4% by weight and the flow rate of solution was 48 ml per minute from each nozzle. The treated bottles were clear and transparent.

The average burst pressure of the clear and transparent treated bottles after abrasion was 258 lb/sq inch. Thus, after abrasion the burst pressure of the bottles treated by the process of the invention was 28% greater than that of bottles which had not been treated with aqueous phosphoric acid solution.

EXAMPLE 4

The process of Example 1 was repeated except that 6.7% by weight of aqueous phosphoric acid solutions was used, the rate of flow of solution was 20 ml per minute from each nozzle, the bottle production rate was 84 per minute and the bottles which were treated were 10 oz amber bottles. The bottles had a clear surface and were of good appearance.

The mean burst pressure of bottles which has been cold-end stearate coated but which had not been treated with aqueous phosphoric acid solution was 342 lb/sq inch. The bottles treated by the process of the invention did not burst and thus the mean burst pressure was in excess of 550 lb/sq inch, the limit of pressure which could be applied in the testing machine.

By way of comparison the above procedure was repeated except that 10.5% by weight aqueous phosphoric acid solution was used, the rate of production of the bottles was 78 per minute, and the bottles used were ½ liter amber bottles.

The mean burst pressure of bottles which had been cold-end stearate coated which had not been treated with aqueous phosphoric acid solution was 220 lb/sq inch and that of bottles treated by the process of the invention was 280 lb/sq inch, or increase of 27%. However, the bottles treated with aqueous phosphoric acid solution, although of increased burst pressure, had a severely mottled appearance and were unsuitable for commercial use.

What we claim is:

1. In a process for treating the surface of a glass container comprising applying a clear and transparent abrasion resistant coating to the surface of the container at an elevated temperature and thereafter applying to the surface of the container a lubricious organic cold-end coating, the improvement which comprises forming the abrasion resistant coating by applying to the surface of the container an aqueous solution of phosphoric acid containing from 0.5% to 10% by weight of phosphoric acid and less than 5% by weight of metal phosphate, the temperature of the surface of the container being at least 300° C.

2. A process as claimed in claim 1 in which the phosphoric acid comprises orthophosphoric acid.

3. A process as claimed in claim 1 in which the concentration of phosphoric acid is at least 1% by weight.

4. A process as claimed in claim 3 in which the concentration of phosphoric acid is not greater than 5% by weight.

5. A process as claimed in claim 3 in which the concentration of phosphoric acid is in the range 1½% to 4% by weight.

6. A process as claimed in claim 1 in which the temperature is in the range 300° to 700° C.

7. A process as claimed in claim 6 in which the temperature is in the range 450° to 650° C.

* * * * *